(12) United States Patent
Lee et al.

(10) Patent No.: US 11,523,255 B2
(45) Date of Patent: Dec. 6, 2022

(54) APPARATUS AND METHOD FOR PERFORMING VEHICLE COMMUNICATION SERVICE

(71) Applicant: Samsung Electronics Co., Ltd., Suwon-si (KR)

(72) Inventors: Hoyeon Lee, Suwon-si (KR); Sunghoon Kim, Suwon-si (KR); Youngkyo Baek, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/054,140

(22) PCT Filed: May 13, 2019

(86) PCT No.: PCT/KR2019/005752
§ 371 (c)(1),
(2) Date: Nov. 9, 2020

(87) PCT Pub. No.: WO2019/216738
PCT Pub. Date: Nov. 14, 2019

(65) Prior Publication Data
US 2021/0258744 A1  Aug. 19, 2021

(30) Foreign Application Priority Data

May 11, 2018 (KR) .................. 10-2018-0054563
Dec. 4, 2018 (KR) .................. 10-2018-0154255

(51) Int. Cl.
*H04W 4/00* (2018.01)
*H04W 4/12* (2009.01)
(Continued)

(52) U.S. Cl.
CPC ............... *H04W 4/12* (2013.01); *H04W 4/40* (2018.02); *H04W 8/005* (2013.01); *H04W 76/11* (2018.02);
(Continued)

(58) Field of Classification Search
CPC ......... H04W 4/12; H04W 4/40; H04W 8/005; H04W 76/11; H04W 76/14
See application file for complete search history.

(56) References Cited

U.S. PATENT DOCUMENTS 11,051,136 B2 * 6/2021 Pattan .................. H04W 4/40
2016/0381720 A1 12/2016 Baek et al.
(Continued)

FOREIGN PATENT DOCUMENTS

KR  10-2018-0014421 A  2/2018
KR  10-2018-0018454 A  2/2018
(Continued)

OTHER PUBLICATIONS

International Search Report dated Aug. 28, 2019 in connection with International Patent Application No. PCT/KR2019/005752, 2 pages.
(Continued)

*Primary Examiner* — Erika A Washington

(57) ABSTRACT

The present disclosure relates to a communication technique for fusing, with IoT technology, a 5G communication system for supporting a higher data transmission rate than a 4G system, and a system thereof. The present disclosure may be
(Continued)

applied to an intelligent service such as a smart home, a smart building, a smart city, a smart car or a connected car, health care, digital education, retail, and security and safety related services on the basis of 5G communication technologies and IoT related technologies. A method for performing a vehicle communication service by a first terminal in a wireless communication system, according to the present disclosure, may comprise the steps of: receiving a first message related to the vehicle communication service from a network entity; determining a parameter of the vehicle communication service on the basis of the first message; receiving a second message related to the vehicle communication service from a second terminal; and determining whether to process the second message on the basis of the parameter of the vehicle communication service.

17 Claims, 13 Drawing Sheets

(51) Int. Cl.
*H04W 76/14* (2018.01)
*H04W 76/11* (2018.01)
*H04W 4/40* (2018.01)
*H04W 8/00* (2009.01)
*H04W 84/00* (2009.01)
*H04W 92/18* (2009.01)

(52) U.S. Cl.
CPC .......... *H04W 76/14* (2018.02); *H04W 84/005* (2013.01); *H04W 92/18* (2013.01)

(56) References Cited

U.S. PATENT DOCUMENTS

| | | |
|---|---|---|
| 2017/0201934 A1 | 7/2017 | Kim et al. |
| 2017/0265018 A1 | 9/2017 | Mok et al. |
| 2018/0061253 A1 | 3/2018 | Hyun |
| 2019/0028862 A1* | 1/2019 | Futaki .................. H04W 92/18 |

FOREIGN PATENT DOCUMENTS

| | | |
|---|---|---|
| KR | 10-2018-0025587 A | 3/2018 |
| WO | 2017/105534 A1 | 6/2017 |
| WO | WO-2017105534 A1 * | 6/2017 |
| WO | 2018/030868 A1 | 2/2018 |

OTHER PUBLICATIONS

Written Opinion of the International Search Authority dated Aug. 28, 2019 in connection with International Patent Application No. PCT/KR2019/005752, 6 pages.

"3rd Generation Partnership Project; Technical Specification Group Services and System Aspects; Architecture enhancements for V2X services (Release 15)", 3GPP TS 23.285 V15.0.0 (Mar. 2018), 36 pages.

Supplementary European Search Report dated Jun. 7, 2021 in connection with European Patent Application No. 19 79 9409, 13 pages.

Qualcomm Inc., "Unicast and multicast V2X communication support over PC5", SA WG2 Meeting #126, Apr. 16-20, 2018, S2-183620, 6 pages.

* cited by examiner

APPARATUS AND METHOD FOR PERFORMING VEHICLE COMMUNICATION SERVICE

CROSS-REFERENCE TO RELATED APPLICATION

This application is a 371 of International Application No. PCT/KR2019/005752 filed on May 13, 2019, which claims priority to Korean Patent Application No. 10-2018-0054563 filed on May 11, 2018 and Korean Patent Application No. 10-2018-0154255 filed on Dec. 4, 2018, the disclosures of which are herein incorporated by reference in their entirety.

BACKGROUND

1. Field

The disclosure relates to a method for performing a V2X communication (vehicle-to-everything (V2X)) service in a 5G mobile communication service.

2. Description of Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Further, the 5G system considers support for various services as compared with the legacy 4G system. For example, most representative services may include, e.g., enhanced mobile broadband (eMBB), ultra-reliable and low latency communication (URLLC), massive machine-type communication (mMTC), and evolved multimedia broadcast/multicast service (eMBMS). The system providing the URLLC service and the system providing the eMBB service, respectively, may be referred to as a URLLC system and an eMBB system. Further, the terms "service" and "system" may be interchangeably used.

Among them, the URLLC service is a service newly considered in the 5G system unlike in the legacy 4G system and, as compared with the other services, this service requires that ultra-high reliability (e.g., a packet error rate of about 10 to about 5) and low latency (e.g., about 0.5 msec) be met. To meet such strict requirements, the URLLC service may adopt a shorter transmission time interval (TTI) than that of the eMBB service and takes into consideration various operation methods utilizing the same.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

V2X communication (vehicle-to-everything, hereinafter, "V2X") is a common term denoting all types of communication schemes applicable to vehicles on the road and enables various additional services, as well as initial safety use cases as wireless communication technology develops.

As technology for providing the V2X service, IEEE 802.11p-based and IEEE P1609-based wireless access in vehicular environments (hereinafter, "WAVE") standards have been established. However, WAVE, a type of dedicated short range communication (DSRC) technology, suffers from a limited message arrival distance between vehicles. To overcome such limitation, standardization for cellular-based V2X technology standards is underway in the 3rd generation partnership project (3GPP). In Release 14, LTE-based 4G V2X standardization has been finished and, in Release 16, standardization for new radio (hereinafter, "NR" or "5G")-based 5G V2X is in progress.

In the disclosure, there is proposed a method for generating vehicle platooning to provide a vehicle platooning service in a 3GPP-based V2X system. Further, there is proposed a method of communication between vehicles enrolled in different mobile communication operators.

Objects of the disclosure are not limited to the foregoing, and other unmentioned objects would be apparent to one of ordinary skill in the art from the following description.

SUMMARY

According to the disclosure, a method for processing a control signal in a wireless communication system comprises receiving a first control signal transmitted from a network entity, processing the received first control signal, and transmitting a second control signal generated based on the processing to the network entity.

According to the disclosure, a method for performing a vehicle communication service by a first user equipment (UE) in a wireless communication system may comprise receiving a first message related to the vehicle communication service from a network entity, determining at least one parameter value of the vehicle communication service based on the first message, receiving a second message related to the vehicle communication service from a second UE, and determining whether to process the second message based on the at least one parameter value.

The vehicle communication service may include a vehicle platooning service. The first message may include information related to at least one parameter for performing the vehicle platooning service.

The information related to the at least one parameter for performing the vehicle platooning service may include a rule for determining the at least one parameter value.

The method may further comprise selecting at least one vehicle platooning group based on the information related to the at least one parameter for performing the vehicle platooning service.

The vehicle communication service may include a driving route providing service. The method may further comprise determining information related to a driving route based on the at least one parameter value.

Determining whether to process the second message based on the at least one parameter value may include, when at least one second parameter value included in the second message is identical to the at least one parameter value, transmitting a message responsive to the second message to the second UE.

If the vehicle communication service is enrolled in a first public land mobile network (PLMN) where the first UE is enrolled, and the second UE enrolls the vehicle communication service in the second PLMN, the first PLMN and the second PLMN may be configured to share the information related to the at least one parameter for performing the vehicle communication service.

According to the disclosure, a first UE configured to perform a vehicle communication service in a wireless communication system may comprise a transceiver configured to receive a first message related to the vehicle communication service from a network entity and receive a second message related to the vehicle communication service from a second UE and a controller configured to determine a parameter value of the vehicle communication service based on the first message and determine whether to process the second message based on the parameter value.

The vehicle communication service may include a vehicle platooning service. The first message may include information related to a parameter for performing the vehicle platooning service.

The information related to the parameter for performing the vehicle platooning service may include a rule for determining the parameter value.

The controller may be configured to select at least one vehicle platooning group based on the information related to the at least one parameter for performing the vehicle platooning service.

The vehicle communication service may include a driving route providing service.

The controller may be configured to determine information related to a driving route based on the at least one parameter value.

The controller may be configured to, when a second parameter value included in the second message is identical to the parameter value, transmit a message responsive to the second message to the second UE by the transceiver.

If the vehicle communication service is enrolled in a first public land mobile network (PLMN) where the first UE is enrolled, and the second UE enrolls the vehicle communication service in the second PLMN, the first PLMN and the second PLMN may be configured to share the information related to the parameter for performing the vehicle communication service.

According to the disclosure, a method of performing a group-based vehicle communication by a first terminal in a wireless communication system may comprise identifying group ID generation rules provisioned to the first terminal, generating a group ID related to the group-based vehicle communication based on the group ID generation rules, and transmitting, to a second terminal, a first message including the group ID, wherein the group ID may correspond to a group of terminals performing the group-based vehicle communication.

The method may further comprise receiving a request for configuring the group of terminals performing the group-based vehicle communication.

The method may further comprise receiving, from the second terminal, a second message including the group ID and communication parameters and storing the communication parameters.

The method may further comprise performing the group-based vehicle communication with the second terminal using the communication parameters. The group-based vehicle communication may be performed by a group of terminals subscribing a vehicle platooning service.

The group ID may correspond to location information as well. If the second terminal is scheduled to visit a location related to the location information, the second terminal may transmit the second message. The location information may include at least one of a destination of the first terminal or an intermediate point related to the destination of the first terminal.

The method may further comprise receiving, from a network entity, a third message including the group ID when the first terminal is connected to the network.

The network entity may include a V2X application server. The method may further comprise receiving information including the group ID generation rules broadcast from the V2X application server.

The network entity may include a road side unit (RSU). The method may further comprise receiving information including the group ID generation rules broadcast from the RSU.

The group ID may include a ProSe Layer-2 Group ID. The first message may be transmitted on a PC5 channel.

A first terminal configured to perform group-based vehicle communication in a wireless communication system may comprise a transceiver, a storage unit, and a controller configured to perform each operation.

According to the disclosure, a UE embedded in, or attached to, a vehicle may use a vehicle communication service provided from a 3GPP V2X system. According to an embodiment of the disclosure, the UE may dynamically determine a group ID for vehicle platooning.

According to an embodiment of the disclosure, the UE may communicate with UEs enrolled in different mobile communication operators.

Effects of the disclosure are not limited to the foregoing, and other unmentioned effects would be apparent to one of ordinary skill in the art from the following description.

DETAILED DESCRIPTION

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, the disclosure adopts terms and names defined in the 3GPP standards. However, the disclosure is not limited by such terms and names and may be likewise applicable to systems conforming to other standards.

The description of embodiments of the disclosure focuses primarily on 3GPP communication standards, but the subject matter of the disclosure may also be applicable to other communication systems with a similar technical background with minor changes without significantly departing from the scope of the present invention, and this may be so performed by the determination of those skilled in the art to which the present invention pertains.

Figure 1:
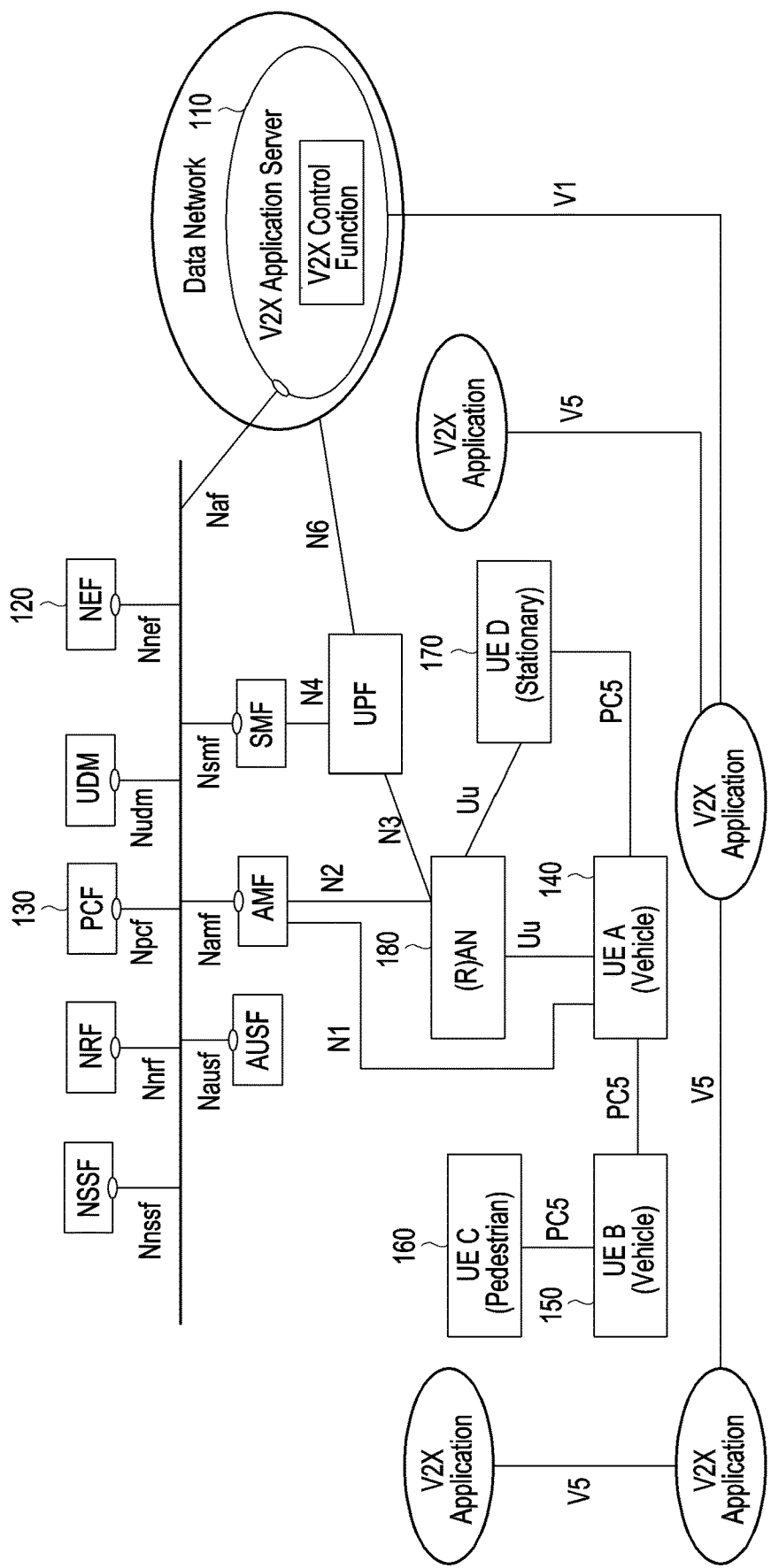
FIG. 1 is an architectural view illustrating an example of a 5G-based V2X system architecture, as a service-based interface between network functions, according to an embodiment of the disclosure.

FIG. 1 is an architectural view illustrating an example of a 5G-based V2X system architecture, as a service-based interface between network functions (hereinafter, "NF"), according to an embodiment of the disclosure.

Referring to FIG. 1, a V2X application server (AS) 110 provides a service, which the V2X AS 110 provides, to another NF via an Naf interface. A network exposure function (NEF) 120 provides a service, which the NEF 120 provides, to another NF via an Nnef interface. A policy control function (PCF) 130 provides a service, which the PCF 130 provides, to another NF via an Npcf interface. For example, the network function, interface, or link defined in 3GPP technical specification (TS) 23.501 is exemplified in the system of FIG. 1.

Referring to FIG. 1, vehicle UEs (UE A 140 and UE B 150) and a pedestrian UE (UE C 160) may perform direct communications therebetween, using a PC5 link. The inter-UE direct communication is described in FIG. 1.

Referring to FIG. 1, UE D 170 is a stationary UE and may be, e.g., a road side unit (RSU). A base station (radio access network (RAN)) 180 may be equipped with the function of an RSU. According to an embodiment, the base station may be denoted an access network (AN).

The RSU (UE D) 170 may perform communication with the vehicle UE (UE A 140 and UE B 150) directly using a PC5 link or via a network using a Uu link.

Referring to FIG. 1, the RSU (UE D) 170 may perform communication with the pedestrian UE (UE C 160) directly using a PC5 link or via a network using a Uu link.

Figure 2:
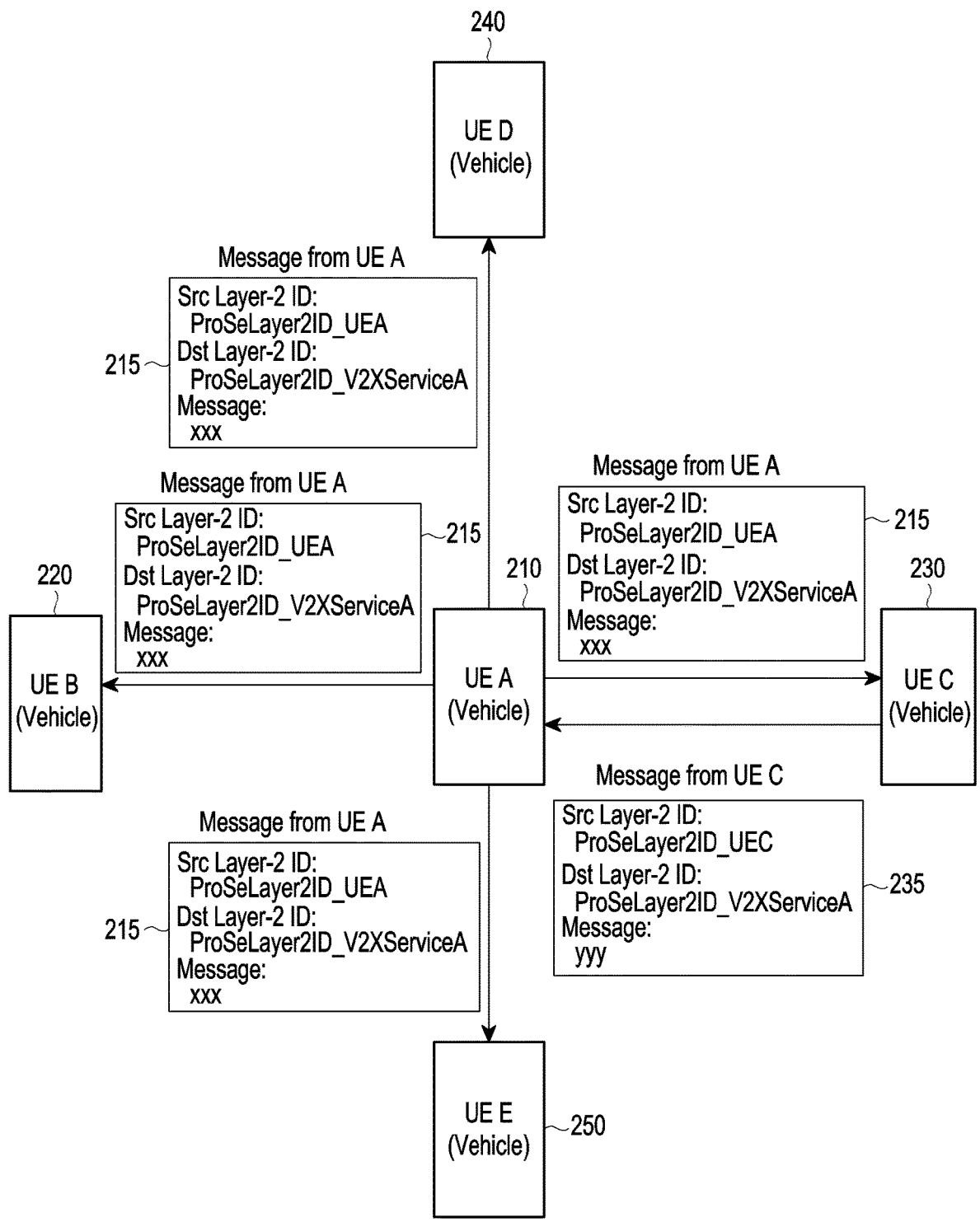
FIG. 2 is an architectural view illustrating an example of another 5G-based V2X system architecture, using inter-network function one-to-one reference points, according to an embodiment of the disclosure.

FIG. 2 is an architectural view illustrating an example of another 5G-based V2X system architecture, using inter-network function one-to-one reference points, according to an embodiment of the disclosure.

The PC5 link-based inter-vehicle UE communication method defined in the 3GPP is described below with reference to FIG. 2, according to an embodiment of the disclosure.

According to the disclosure, the vehicle UE may be a device embedded in a vehicle or may be a UE, e.g., a smartphone or black box, attached to a vehicle. In the disclosure, V2X may be performed via communication between vehicle UEs embedded in, or attached to, vehicles. In the disclosure, V2X may be performed via communication between the vehicle embedded in, or attached to, the vehicle and the network entity (NE).

To describe the PC5 link-based inter-vehicle UE communication method defined in the 3GPP, referring to FIG. 2, it is hypothesized that five vehicle UEs (hereinafter, referred to as "UEs") enrolled in a 3GPP-based V2X service are present. It is assumed that among the five UEs (UE A 210, UE B 220, UEC 230, UE D 240, and UE E 250), UE A 210 and UEC 230 are enrolled in V2X service A, and the other UEs, i.e., UE B 220, UE D 240, and UE E 250 are not enrolled in V2X service A.

The network entity (e.g., V2X control function or V2X application server) defined in the 3GPP standard may provide information about at least one V2X service parameter to allow UE A 210 and UE B 220, enrolled in V2X service A, to use V2X service A. The V2X service parameter may include the service ID indicating V2X service A and the ProSe Layer-2 ID which is the ID of the link layer mapped to the service ID (e.g., the value of the ProSe Layer-2 ID may include ProSeLayer2ID_V2XServiceA). UE A 210 and UE B 220 may store the value of the service ID and the value of the ProSe Layer-2 ID mapped to the service ID.

UE A 210 may generate the application message corresponding to V2X service A. The application message may include messages periodically transmitted from the UE and messages generated when such an event occurs as sudden braking or sudden start.

Referring to FIG. 2, the application message 215 may be denoted as xxx. UE A 210, which has generated the application message 215 for V2X service A, may set the Source ProSe Layer-2 ID (Src Layer-2 ID) as its own ProSe Layer-2 ID to send the generated application message 215 and set the Destination ProSe Layer-2 ID (Dst Layer-2 ID) as the ProSeLayer2ID_V2XServiceA which is the ProSe Layer-2 ID corresponding to V2X service A previously received from the V2X control function or V2X application server and stored.

UE A 210 may broadcast the application message 215 to its neighbor UEs via the PC5 link. UE B 220, UE C 230, UE D 240, and UE E 250, which are the neighbor UEs of UE A 210, may receive the application message 215 sent out from UE A 210 via the PC 5 link. The UE receiving the application message 215 may look into the Destination ProSe Layer-2 ID of the application message 215, thereby identifying whether the received application message 215 is the application message corresponding to the service that it has enrolled in. Since UE C 230 has enrolled in V2X service A, UE C 230 may process the received application message. UE B 220, UE D 240, and UE E 250 are not enrolled in V2X service A and may thus disregard the received message 215.

In the same manner, if UE C 230 generates an application message corresponding to V2X service A (referring to FIG. 2, the application message is denoted as yyy, 235), UE C 230 may set the Source ProSe Layer-2 ID (Src Layer-2 ID) as its own ProSe Layer-2 ID and set the Destination ProSe Layer-2 ID (Dst Layer-2 ID) as the ProSeLayer2ID_V2XServiceA corresponding to V2X service A previously received from the V2X control function or V2X application server and stored and may broadcast the application message 235 to the neighbor UEs via the PC5 link. Among the UEs receiving the application message 235, only UEs enrolled in V2X service A may process the message.

Figure 3:
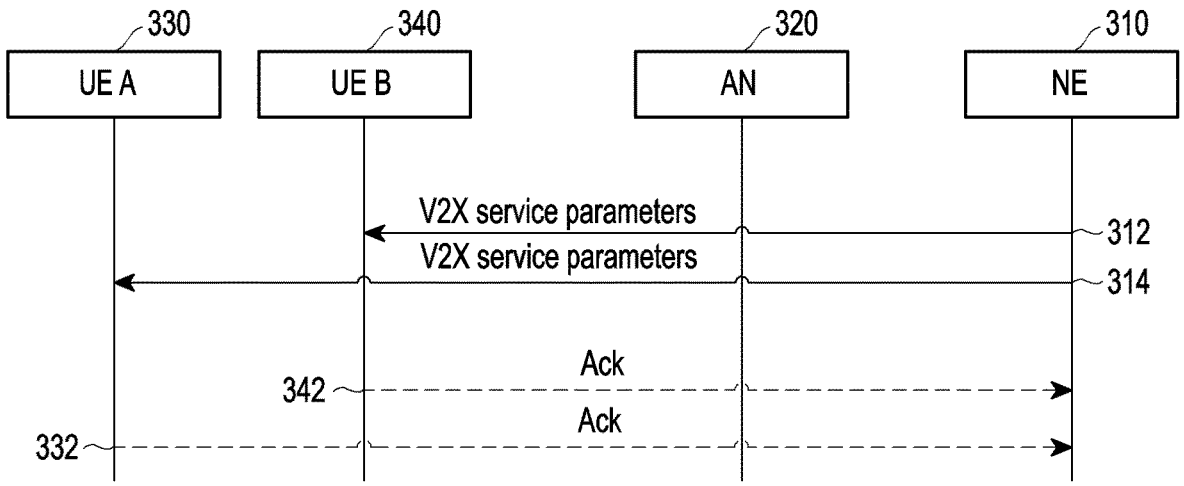
FIG. 3 is a view illustrating a procedure for obtaining a V2X service parameter from a network, by a UE, according to an embodiment of the disclosure.

FIG. 3 is a view illustrating a procedure for obtaining a V2X service parameter from a network, by a UE, according to an embodiment of the disclosure.

Referring to FIG. 3, the network entity (hereinafter, "NE") 310 may send a V2X service parameter to the UEs (UE A 330 and UE B 340) via an access network (or base station, hereinafter, referred to as an "AN") 320 that the UEs (UE A 330 and UE B 340) have connected to (312 and 314). As a communication method by which the NE 310 sends the V2X service parameter to the UEs (UE A 330 and UE B 340), a unicast, multicast, or broadcast transmission method may be used.

According to an embodiment of the disclosure, the NE 310 may be the V2X application server (hereinafter, "V2X AS") or the PCF of the 5G core network or V2X control function defined in the 3GPP. The V2X service parameter transmitted from the NE 310 may include a rule in which the UE may determine (derive) the ProSe Layer-2 ID necessary to perform a vehicle platooning service. The rule may include information included in the ProSe Layer-2 ID and the number of bits that may indicate the information. For example, in the case where the ProSe Layer-2 ID is configured of 24 bits, the first four bits may be set as a value indicating the V2X service provider, the next four bits as a value indicating the vehicle platooning service being currently used, and the next 16 bits as a value indicating destination location information of vehicle platooning. The number of the bits may be an arbitrary value for the purpose of describing the instant example, and its range may be varied.

According to an embodiment, the UEs (UE A 330 and UE 340) receiving the V2X service parameter may transmit response messages 342 and 332 to the NE 310.

Figure 4:
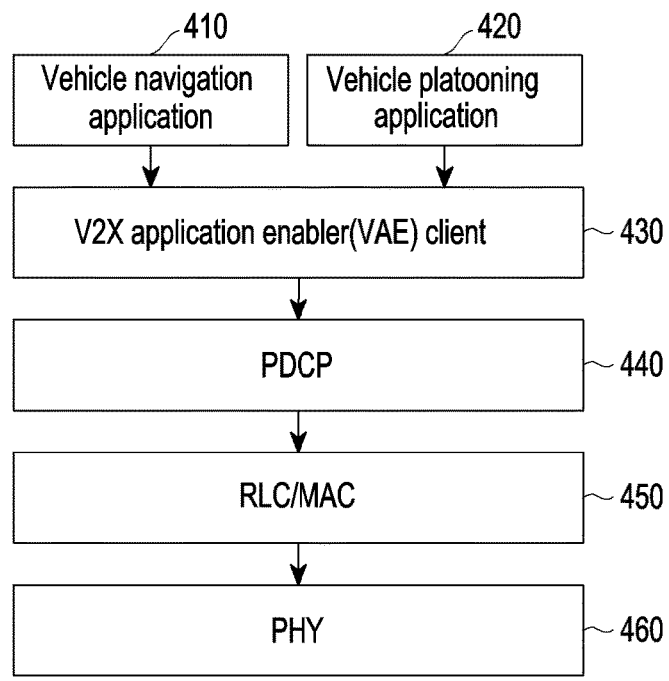
FIG. 4 is a view illustrating a communication protocol stack of a UE, according to an embodiment of the disclosure.

FIG. 4 is a view illustrating a communication protocol stack of a UE, according to an embodiment of the disclosure.

Referring to FIG. 4, according to an embodiment of the disclosure, the UE may drive a vehicle navigation application 410 installed on the UE and input a destination. The location information corresponding to the destination may be transferred to the V2X application enabler (hereinafter, "VAE") 430 of the lower layer. The location information may be, e.g., the GPS value or the address of the destination. The location information may include information about one or more highway junctions (e.g., interchange (IC) information), which are to be passed to arrive at the destination, and the location information may be transferred to the VAE 430. The VAE 430 may determine the value of the ProSe Layer-2 ID for a vehicle platooning service, based on the ProSe Layer-2 ID determination rule received from the NE 210 of FIG. 2 and the location information received from the vehicle navigation application. Each UE may perform the process, described in connection with the instant embodiment, in the same manner, thereby determining the value of the ProSe Layer-2 ID which corresponds to the destination of each vehicle. By the process, the same ProSe Layer-2 ID value may be derived according to the location information provided from the navigation application 410 to the VAE 430 or a different ProSe Layer-2 ID value may be derived. The UEs which determine and use the same ProSe Layer-2 ID value may be recognized as a single vehicle platooning group.

According to an embodiment of the disclosure, the UE may execute an application (vehicle platooning application) 420 for a vehicle platooning service. Or, the vehicle platooning application 420 may be implicitly executed when the vehicle navigation application 410 is driven.

According to an embodiment of the disclosure, the UE may generate a message for the vehicle platooning service and, to transmit the generated message to the neighbor UEs, set the Source ProSe Layer-2 ID (Src Layer-2 ID) as its ProSe Layer-2 ID and the Destination ProSe Layer-2 ID (Dst Layer-2 ID) as the ProSe Layer-2 ID determined by the UE during the above process.

The generated message may be transferred to the lower layers (PDCP 440, RLC/MAC 450, and PHY 460) and, according to an embodiment of the disclosure, the UE may broadcast the generated message to the neighbor UEs via the PC5 link. The neighbor UE receiving the message may look into the Destination ProSe Layer-2 ID of the received message, thereby identifying whether the received message is a message corresponding to the same vehicle platooning group. When the message is a message corresponding to the same vehicle platooning group, the neighbor UE receiving the message may process the received message. When the message is a message corresponding to a different vehicle platooning group, the received message may be disregarded.

Figure 5A:
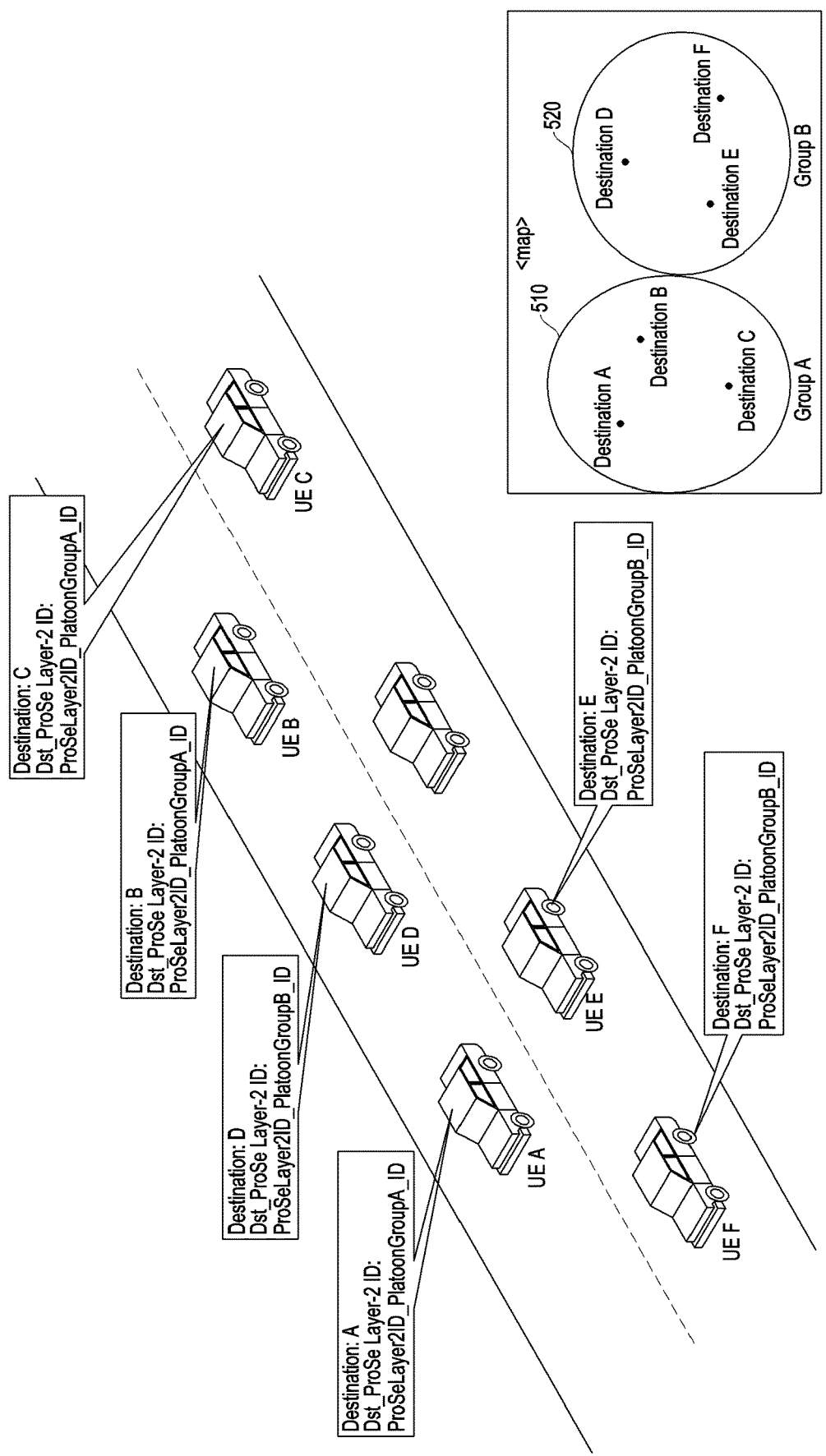
FIG. 5A is a view illustrating an example of configuring a vehicle platooning group according to an embodiment of the disclosure.

FIG. 5A is a view illustrating an example of configuring a vehicle platooning group according to an embodiment of the disclosure.

The vehicles corresponding to destination A, destination B, and destination C may determine the same ProSe Layer-2 ID value according to the rule of determining the ProSe Layer-2 ID and drive in the same vehicle platooning group (group A) 510. The vehicles corresponding to destination D, destination E, and destination F may determine the same ProSe Layer-2 ID value according to the rule of determining the ProSe Layer-2 ID and drive in the same vehicle platooning group (group B) 520.

According to an embodiment of the disclosure, the NE 310 shown in FIG. 3 may be a road side unit (RSU) defined in the 3GPP for a V2X service. In this case, the RSU and the AN (base station) 320 shown in FIG. 3 may be installed (co-located) in the same physical equipment. Or, the RSU may be installed as an independent UE.

According to an embodiment of the disclosure, the RSU may provide the UE with information about the V2X service parameter according to the procedure shown in FIG. 3. The RSU may use a broadcast transmission method using the multimedia broadcast/multicast service (MBMS) or broadcast using the PC5 link to provide the information about the V2X service parameter. The information about the V2X service parameter may include mapping information between specific location information and the ProSe Layer-2 ID (or sidelink Layer-2 ID) corresponding to the location information.

Figure 5B:
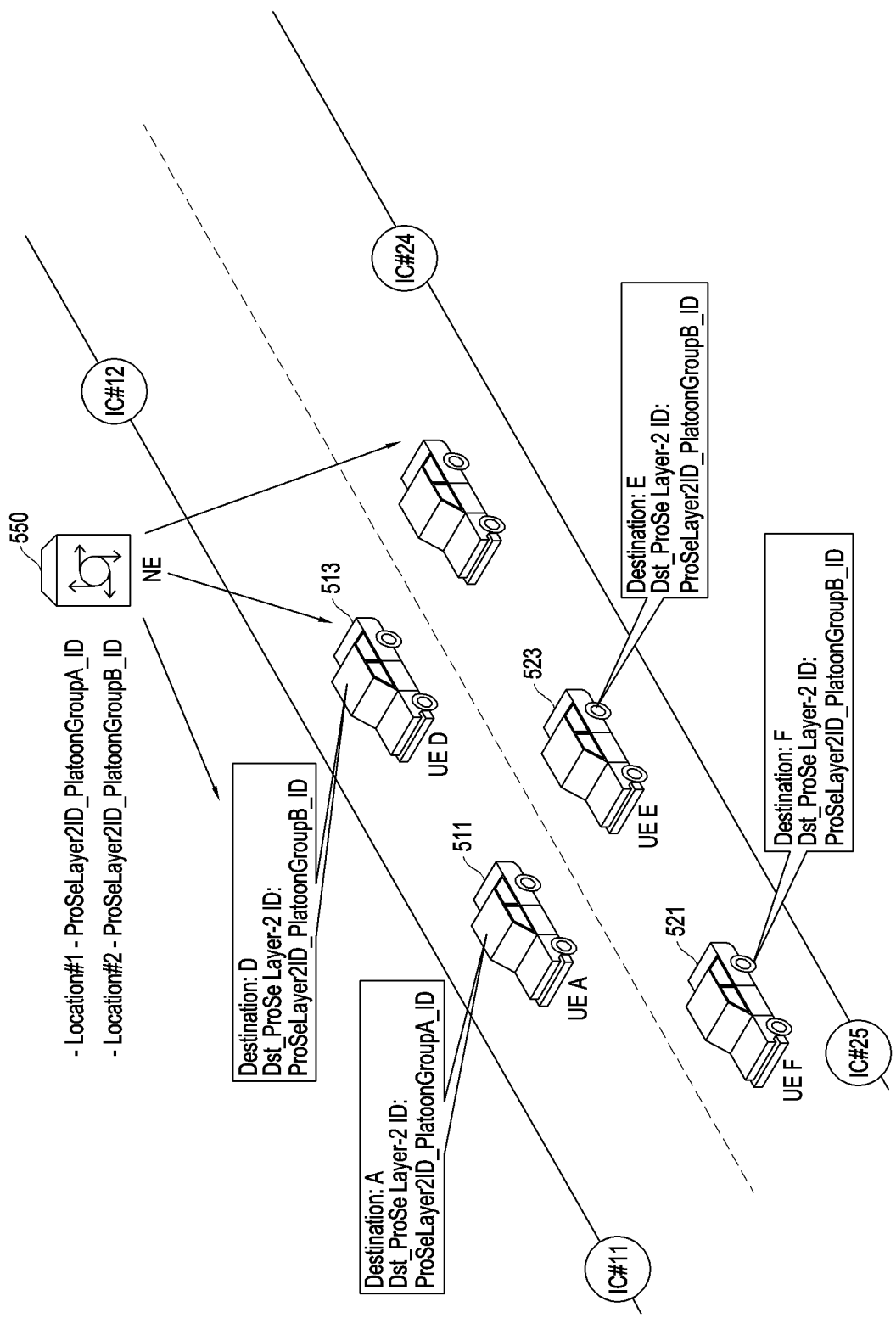
FIG. 5B is a view illustrating an example of configuring a vehicle platooning group, by a UE, based on a V2X service parameter provided from a network entity, according to an embodiment of the disclosure.

FIG. 5B is a view illustrating an example of configuring a vehicle platooning group, by a UE, based on a V2X service parameter provided from a network entity, according to an embodiment of the disclosure.

Referring to FIG. 5B, information about the V2X service parameter that the NE (e.g., the RSU 550) transfers to the UEs (UE A 511, UE D 513, UE F 521, and UE E 523) in a broadcast message may include at least one of Location #1, which is specific location information, and mapping interface of ProSeLayer2ID_PlatoonGroupA_ID, which is the ProSe Layer-2 ID corresponding to Location #1, and Location #2 and mapping information of ProSeLayer2ID_PlatoonGroupB_ID, which is the ProSe Layer-2 ID corresponding to Location #2.

The location information included in the V2X service parameter and the location information of the ProSe Layer-2 ID mapping information (hereinafter, denoted as {location, ProSe Layer-2 ID} mapping) corresponding to the location may be denoted as global positioning system (GPS) information, longitude, latitude, altitude, intersection ID, and highway interchange (IC) of the corresponding location. Further, the direction of traveling (e.g., upbound, downbound, east/west/north/south, reference location/location in the travelling direction (the UE may calculate the travelling direction using a relative value between the reference location and the location in the travelling direction), along with the {location, ProSe Layer-2 ID} mapping information, may be displayed.

The V2X service parameter information transferred from the NE (e.g., the RSU 550) to the UE may not include the {location, ProSe Layer-2 ID} mapping information or may include one or more pieces of {location, ProSe Layer-2 ID} mapping information.

The V2X service parameter information transferred from the NE (e.g., the RSU 550) to the UE may include, e.g., the location information about the NE 550 (e.g., the GPS information, longitude, latitude, and altitude of the NE 550, the ID of the intersection where the NE 550 is located, and traffic light ID), and location information about a nearby RSU (e.g., the GPS information, longitude, latitude, and altitude of the nearby RSU, the ID of the intersection where the RSU is located, and traffic light ID).

Further, the V2X service parameter information may include, e.g., traffic code information about the surrounding area, traffic context information, and event occurrence information.

The traffic code information may include road speed limits, location of traffic light (e.g., the GPS information, longitude, latitude, and altitude of the traffic light and the ID of the intersection where the traffic light is located), and status information (e.g., red, yellow, green and the remaining time of the current light color). Further, the traffic code information may include information indicated by traffic signs on the road (e.g., school zone, unprotected left turn lane, U-turn lane, bus-only lane, and rockfall).

The traffic context information may include the number of vehicles on the road, vehicle density, vehicle driving speed, or such information, to indicate whether traffic is light or heavy. Further, the traffic context information may also display, e.g., traveling direction (e.g., upbound, downbound, reference location/travelling direction). Further, the traffic context information may include lane information and traffic context information about each lane. Further, the traffic context information may include future traffic context prediction information (e.g., congestion-predicted sections and times, and light traffic-predicted sections and times).

The event occurrence information may indicate, e.g., road traffic accident information, lane change information, lane closure information, obstacle information, road work information, and information about the location where the corresponding event occurs (e.g., the GPS information, longitude, latitude, and altitude of the location where the event occurs, and the ID of the intersection where the traffic light is located).

According to an embodiment of the disclosure, the UE may set a driving route using a navigation application to get to the destination and generate a road map to the driving route. The operation of generation may use map information stored in the UE or map information received from a vehicle service server via a network and a vehicle service server.

The UE receiving the V2X service parameter from the NE 550 may store the received V2X service parameter information in the UE. The UE may update the road map displaying the UE's driving route using the received V2X service parameter information.

Further, the UE may compare the driving route on the navigation application with the V2X service parameter information. The UE may determine whether there is corresponding V2X service parameter information in the location on the driving route of the navigation application.

The UE may display the V2X service parameter information received from the NE 550 on the map, in the driving route of the navigation application. For example, the corresponding information for the case where the driving route includes an area where an accident occurs and the case where the speed limit of a specific area on the driving route is changed may be displayed on the map. Further, the UE may display the location of other nearby RSUs on the map.

Further, the UE may use the V2X service parameter information received from the NE 550 in directing the driving route of the navigation application in voice. For example, if the speed limit of a specific area on the driving route is changed, the changed speed limit may be given in a voice message when the vehicle passes through the area. Or, as an example, if the lane of a specific area is closed, an instruction may be given to let the vehicle drive on a lane other than the closed lane when passing through the area.

Further, the UE may use the V2X service parameter information received from the NE 550 in autonomous driving. For example, if the speed limit of a specific area on the driving route is changed, the vehicle may drive according to the changed speed limit when passing through the area. Or, as an example, if the lane of a specific area is closed, the vehicle may drive on a lane other than the closed lane when passing through the area.

Further, the UE may update the driving route of the navigation application using the received V2X service parameter information. For example, when such an event occurs as, e.g., traffic accident, lane closure, or road work on the driving route currently set, a new driving route which detours the area may be set. Further, when the UE sets a new driving route, a new driving route to detour the current congested area may be set. Further, the UE may set a new driving route considering the section in which congestion is expected and the time taken for the vehicle to travel from the current location to the section where congestion is expected.

The UE receiving the V2X service parameter from the NE 550 may select the location corresponding to the destination and the ProSe Layer-2 ID value mapped to the destination or the location, based on the destination of each UE and the mapping information received from the NE 550. The vehicles selecting the same ProSe Layer-2 ID value may be recognized as the same vehicle platooning group.

According to an embodiment of the disclosure, the UE may use the received travelling direction information, along with the {location, ProSe Layer-2 ID} mapping information in selecting the location corresponding to the destination and the ProSe Layer-2 ID value ({location, ProSe Layer-2 ID} mapping) mapped to the location or the destination. Further, the UE may use the driving route information of the navigation application set to travel to the destination. For example, the UE receiving the {location, ProSe Layer-2 ID} mapping information list from the NE 550 may determine whether the location information included in the {location, ProSe Layer-2 ID} mapping information list is present on the driving route set by the UE. If the location information included in the {location, ProSe Layer-2 ID} mapping information list is present on the driving route set by the UE, the UE may store the ProSe Layer-2 ID value available per location on the driving route and update the map. If there are two or more ProSe Layer-2 ID values available on the route to go to the destination, i.e., if there are two or more vehicle platooning groups that may join the route to the destination, the UE may select the group which it is to join.

As a method for the UE to select one among the two or more vehicle platooning groups, comparison may be performed between the UE's current location and the target location (i.e., corresponding to the location of the {location, ProSe Layer-2 ID} mapping information) of each vehicle platooning group and determination may be made. For example, the ProSe Layer-2 ID of the vehicle platooning group in the target location closest to the current location may be selected. Or, the ProSe Layer-2 ID of the vehicle platooning group in the target location farthest from the current location may be selected. Or, the ProSe Layer-2 ID of the vehicle platooning group in the target location between the closest target location and the farthest location may be selected.

Or, as a method for the UE to select one among the two or more vehicle platooning groups, selection may be made based on the number of vehicles that have currently joined each vehicle platooning group. For example, the number of vehicles may indicate the number of vehicles. For example, the ProSe Layer-2 ID of the vehicle platooning group which the smallest number of vehicles have currently joined may be selected. In the case of the vehicle platooning group which the smallest number of vehicles have currently joined, the vehicles belonging to the same vehicle platooning group are located close to one another, so that communication range is short, and inter-vehicle information exchange may be quickly performed. Or, the ProSe Layer-2 ID of the vehicle platooning group which the largest number of vehicles have currently joined may be selected. In the case of the vehicle platooning group which the largest number of vehicles have currently joined, information exchange occurs among many vehicles, so that much information may be advantageously obtained. Or, the ProSe Layer-2 ID of the vehicle platooning group having vehicles whose number is smaller than that of the vehicle platooning group having the largest number of vehicles and larger than that of the vehicle platooning group having the smallest number of vehicles may be selected.

For the UE to determine the number of vehicles that have currently joined the vehicle platooning group, the NE (e.g., the RSU 550) may transmit the number of vehicles, which have currently joined the vehicle platooning group, along with {location, ProSe Layer-2 ID}. The UE receiving the information may be aware of the current number of vehicles of the vehicle platooning group corresponding to {location, ProSe Layer-2 ID} received from the NE (e.g., the RSU 550).

Or, in order for the UE to determine the number of vehicles that have currently joined the vehicle platooning group, the UE may send out a discovery request message with the ProSe Layer-2 ID corresponding to each vehicle platooning group. The discovery request message may include information (e.g., vehicle ID, vehicle stationary ID, vehicle identification number, vehicle manufacturer, vehicle type, and color) that may identify the UE generating and transmitting the message. The discovery request message may be transmitted as a broadcast/multicast message. The vehicles which have joined the vehicle platooning group among the neighbor vehicles receiving the discovery request message may process the discovery request message and transmit a discovery response message to the UE. The discovery response message may include information (e.g., vehicle ID, vehicle stationary ID, vehicle identification number, vehicle manufacturer, vehicle type, and color) that may identify the vehicle UE generating and transmitting the message. The discovery response message may be transmitted over unicast, broadcast/multicast. The UE receiving the discovery response messages from the neighbor vehicles may count the received discovery response messages, determining whether the number of the vehicles joining each vehicle platooning group is relatively many or small.

According to an embodiment of the disclosure, the UE may generate a message for the vehicle platooning service and, to transmit the generated message to the neighbor UEs, set the Source ProSe Layer-2 ID (Src Layer-2 ID) as its ProSe Layer-2 ID and the Destination ProSe Layer-2 ID (Dst Layer-2 ID) as the ProSe Layer-2 ID selected by the UE in the embodiment in which the UE configures a vehicle platooning group based on the V2X service parameter.

According to an embodiment of the disclosure, the UE may transmit the discovery request messages to the neighbor vehicles. In other words, the UE may generate one discovery request message per vehicle platooning group. The Dst ProSe Layer-2 ID of each discovery request message may be set as the ProSe Layer-2 ID of the corresponding vehicle platooning group. The Src ProSe Layer-2 ID of each discovery request message may be set as the UE's own ProSe Layer-2 ID. In other words, the Src ProSe Layer-2 ID of the discovery request message generated by the UE per vehicle platooning group may be identical to the UE's own ProSe Layer-2 ID and, as the Dst ProSe Layer-2 ID, a different ProSe Layer-2 ID corresponding to each vehicle platooning group received from the NE (e.g., the RSU 550) may be put to use.

According to an embodiment of the disclosure, the UE may broadcast the discovery request messages to the neighbor UEs via the PC5 link. The neighbor UE receiving the discovery request message may look into the Destination ProSe Layer-2 ID of the received message, thereby identifying whether the received message is a message corresponding to the same vehicle platooning group. When the message is a message corresponding to the same vehicle platooning group, the received message may be processed. When the message is a message corresponding to a different vehicle platooning group, the received message may be disregarded.

The UE receiving the discovery request message may process the discovery request message in the above-described method. In other words, the UE receiving the discovery request message transmitted over broadcast may look to the Dst ProSe Layer-2 ID of the discovery request message, determining whether the message is a message corresponding to the vehicle platooning group that the UE has joined. If the message is a message corresponding to the same vehicle platooning group, i.e., if the Dst ProSe Layer-2 ID is the ProSe Layer-2 ID corresponding to the vehicle platooning group which it has joined, the UE may process the received message. The UE may generate and transmit a discovery response message which is responsive to the discovery request message. The Src ProSe Layer-2 ID of the discovery response message may be set as the UE's own ProSe Layer-2 ID. Further, the Dst ProSe Layer-2 ID of the discovery response message may be set to the same value as the Src ProSe Layer-2 ID of the discovery request message. By this method, the discovery response message may be transmitted over unicast to the UE which has transmitted the discovery request message. The discovery response message may include vehicle platooning group information corresponding to the message.

The UE receiving the discovery response message may derive a relative comparison value of the number of vehicles that have joined each vehicle platooning group, using the vehicle platooning group information included in each message and the number of messages received.

The UE may determine which vehicle platooning group the UE is to join based on the relative comparison value of the number of vehicles that have joined each vehicle platooning group, which has been derived. The UE may store vehicle information (information for indicating the UE having transmitted the discovery response message (e.g., vehicle ID, vehicle stationary ID, vehicle identification number, vehicle manufacturer, vehicle type, and color)) included in the discovery response message received from the UEs in the vehicle platooning group which the UE determined to join and the mapping information of the Dst ProSe Layer-2 ID value of the discovery response message. For example, the UE may store and manage the mapping information of the ProSe Layer-2 ID value of each UE, which is the UE ID information necessary for communication, and the vehicle identification information which is ID information for physically identifying the UEs belonging to the same vehicle platooning group.

Referring to FIG. 5B, UE A 511 and UE B 513 may select the ProSe Layer-2 ID corresponding to Location #1 to go to destination A and destination B, respectively, and drive in the same vehicle platooning group (group A, 510). UE E 521 and UE F 523 may select the ProSe Layer-2 ID corresponding to Location #2 to go to destination E and destination F, respectively, and drive in the same vehicle platooning group (group B, 520).

In the method for the UE to compare the location information (Location #1 and Location #2) received from the NE 550, the UE's destination may be identical to the geographical location indicated by the location information received from the NE 550, may be a nearby area, or may be an intermediate location on the route which it needs to pass to the destination. Or, the location information (Location #1 and Location #2) provided from the NE 550 may be highway junction information (IC information, e.g., IC #11, IC #12, IC #24, IC #25).

Referring to FIG. 5B, Location #1 may correspond to IC #12. Further, Location #2 may correspond to IC #25. UE A 511 is travelling from IC #11 to IC #12 to get to destination A, may receive the mapping information from the NE 550, and may select the ProSe Layer-2 ID corresponding to IC #12, i.e., Location #1. Destination B which UE B 513 desires to travel to may be different from destination A but, like destination A, it needs to pass IC #12 to get to destination B. Accordingly, the ProSe Layer-2 ID selected by vehicle UE B 513 may be identical to the ProSe Layer-2 ID selected by UE A, and UE A 511 and UE D 513 may drive in the same vehicle platooning group until it reaches IC #12.

According to an embodiment of the disclosure, messages may be exchanged between the vehicles belonging to the same vehicle platooning group. If UE A 511, which joins a vehicle platooning group and drives, needs to send V2X messages to all of the vehicles included in the vehicle platooning group, UE A 511 may set the ProSe Layer-2 ID corresponding to the vehicle platooning group, where it currently belongs, as the Dst ProSe Layer-2 ID of the V2X message and transmit the same as a broadcast message. Or, if UE A 511 needs to send a V2X message to a specific vehicle, UE A may set the ProSe Layer-2 ID of the specific vehicle as the Dst ProSe Layer-2 ID of the V2X message and transmit the same as a unicast message. For example, when UE A 511 and UE B 5513 drive in the same vehicle platooning group, UE A 511 may store and manage the mapping information of the ProSe Layer-2 ID value of each UE which is UE ID information necessary for communication and information (e.g., vehicle identification information, vehicle manufacturer, vehicle type, and color) for physically identifying UE D 513. Further, UE A 511 may record the neighbor vehicles using the camera equipped in UE A 511 and recognize the vehicle numbers of the neighbor vehicles. UE A 511 may recognize the vehicle number of UE D 513, to which the message is to be transmitted, using the camera and figure out the ProSe Layer-2 ID value of UE D 513 mapped with the corresponding vehicle number. Further, UE A 511 may identify the vehicle identification number (VIN) corresponding to the recognized vehicle number. UE A 511 may generate a V2X message to be transmitted to UE D 513, set the ProSe Layer-2 ID of UE D 513 as the Dst ProSe Layer-2 ID of the V2X message, and transmit the same as a unicast message.

According to an embodiment of the disclosure, the NE 450 shown in FIG. 5B may be a V2X AS providing the V2X service. According to an embodiment of the disclosure, the V2X AS may provide the UE with information about the V2X service parameter according to the procedure shown in FIG. 2. The message sent from the V2X AS in the procedure may be transferred to the AN (base station) via the user plane function (UPF) and may be provided from the AN to the UE. The V2X AS may use a broadcast transmission method using the MBMS to provide the information about the V2X service parameter. The information about the V2X service parameter may include specific location information and the mapping information of the ProSe Layer-2 ID corresponding to the location information.

FIG. 5B is a view illustrating an example of configuring a vehicle platooning group, by a UE, based on a V2X service parameter provided from a V2X AS, according to an embodiment of the disclosure. The V2X service parameter information provided from the V2X AS and the UE's operation process may be identical to the embodiment for the case where the above-described NE 550 is the RSU.

Figure 6:
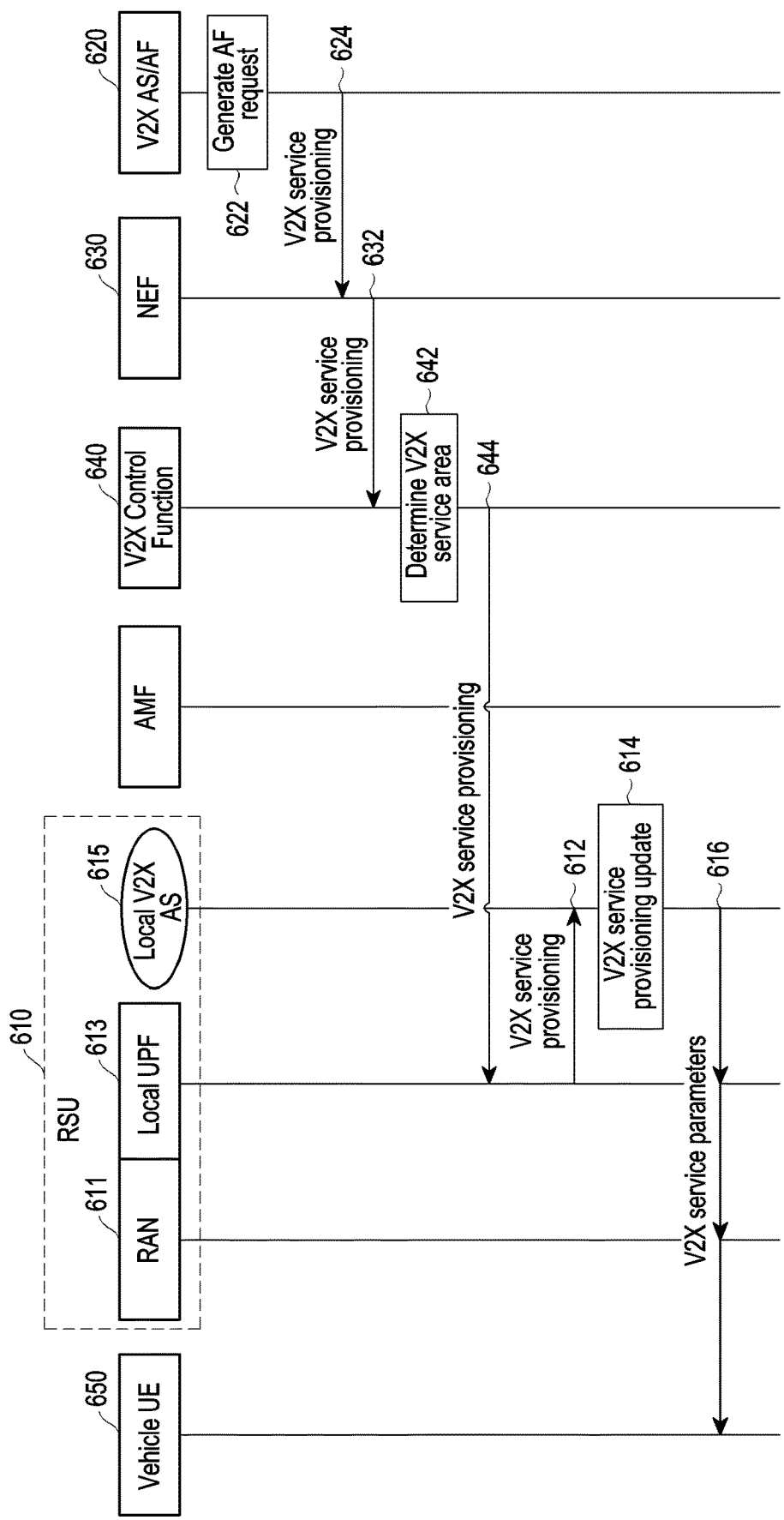
FIG. 6 is a view illustrating an example procedure for provisioning a V2X service parameter in a network entity, according to an embodiment of the disclosure.

FIG. 6 is a view illustrating an example procedure for provisioning a V2X service parameter in a network entity, according to an embodiment of the disclosure.

The procedure according to FIG. 6 may be a procedure for obtaining V2X service-related information by the RSU (e.g., the (R)AN 180 of FIG. 1) equipped in the base station.

Referring to FIG. 6, the RSU 610 may include a base station 611 of a mobile communication network, a local gateway (UPF) 613 connected with the base station, and a V2X server (Local V2X AS) 615 connected with the local gateway.

Referring to FIG. 6, the V2X server (V2X AS/AF) 620 may transmit a V2X service provisioning request message 622 to the network exposure function (NEF) 630. The V2X service provisioning request message 622 may include one or more of the service ID (e.g., Application ID, PSID (Provider Service ID), ITS-AID(ITS(Intelligent Transport Systems) Application Identifier)) indicating the V2X service and the service area (e.g., service area, cell ID, or a list of cell IDs) to which the V2X provisioning applies.

The NEF 630 receiving the V2X service provisioning request message 622 may transfer the received message to the V2X control function (CF) 640 (632). The V2X CF 640 receiving the request message may look to the service area information included in the request message and determine the area where the V2X service provisioning is to apply and the local gateway (local UPF) 613 of the corresponding area (642).

The V2X CF 640 determining the area where V2X service provisioning is to apply may transmit a V2X service provisioning request message to the local gateway 613 (644). The request message may include information about the local V2X server (local V2X AS) to which the V2X provisioning request message has been transferred. The local gateway 613 receiving the request message may transfer the request message to the local V2X server 615 (612).

The local V2X server 615 receiving the request message may update or re-process the V2X provisioning information based on the information included in the received message. Further, the local V2X server 615 may transmit the V2X service parameter information to the vehicle UE 650 (616). The procedure in which the vehicle UE 650 obtains the V2X service parameter from the network is shown in FIG. 3.

Figure 7:
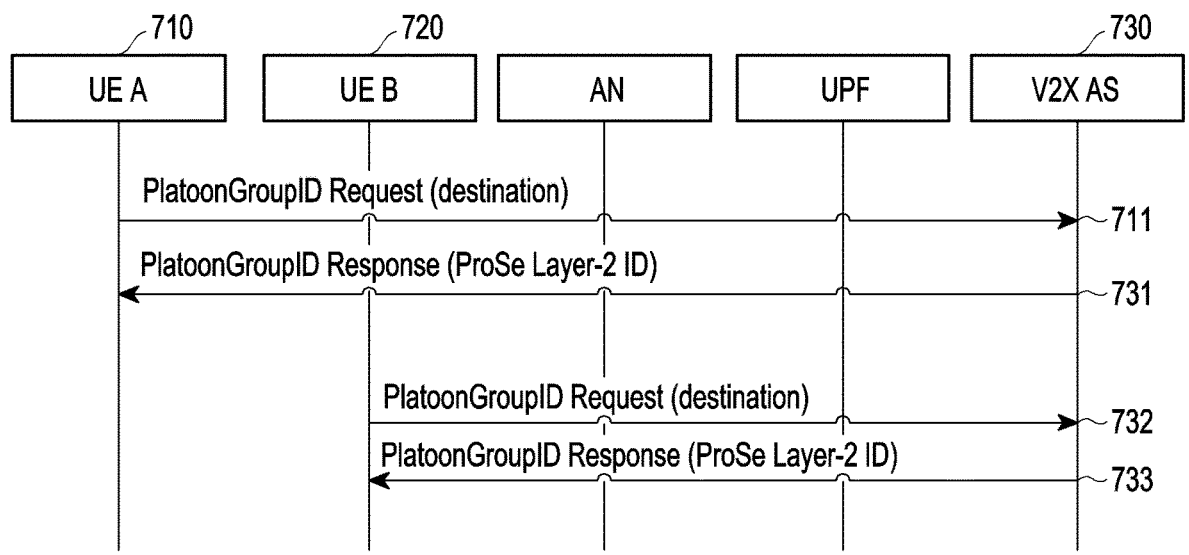
FIG. 7 is a view illustrating a method for configuring a vehicle platooning group at a request from a UE, according to an embodiment of the disclosure.

FIG. 7 is a view illustrating a method for configuring a vehicle platooning group at a request from a UE, according to an embodiment of the disclosure.

Referring to FIG. 7, to start vehicle platooning, UEs (UE A 710 and UE B 720) may transmit request messages 711 and 721 to send a request for the ProSe Layer-2 ID of the vehicle platooning group to the V2X AS 730. The request messages 711 and 721 may include information about the destinations which the UEs (UE A 710 and UE B 720) are to reach. Further, the request message 711 or 721 may include, e.g., the UE's current location information, the UE's driving direction, and the ID of the public land mobile network (PLMN) in which the UE has enrolled. The V2X AS 730 receiving the request message 711 or 721 may determine the vehicle platooning group where the UE needs to belong, based on the information included in the request message 711 or 721, e.g., information about the destination which the UE is to reach. The V2X AS 730 may include the ProSe Layer-2 ID corresponding to the determined group in the vehicle platooning group response message 731 or 733 and transmit the same to the UE (UE A 710 or UE B 720). The UE (UE A 710 or UE B 720) receiving the vehicle platooning group response message may use the ProSe Layer-2 ID included in the vehicle platooning group response message as the value of the Destination ProSe Layer-2 ID. Further, during the course, the V2X AS 730 may determine an intermediate route that the UE (UE A 710 or UE B 720) is to pass to the requested destination, include the intermediate route location and the ProSe Layer-2 ID corresponding to each intermediate route in the vehicle platooning group response message, and transmit the same to the UE (UE A 710 or UE B 720). During the course of driving to the destination, the UE (UE A 710 or UE B 720) may use the ProSe Layer-2 ID corresponding to the intermediate route suitable for the current location.

Meanwhile, the UE observing the standard defined in the 3GPP may enroll in the V2X service via the PLMN where the UE belongs to use the V2X service and receive the V2X service from the V2X AS. As such, to allow the UE to use the V2X service, the V2X control function or V2X AS of the PLMN may provide information about the related V2X service parameter to the UE. The information about the V2X service parameter may include the service ID indicating the V2X service and the value of the ProSe Layer-2 ID of the link layer mapped to the V2X service. The UE may store the information mapped to the V2X service and, upon using the V2X service, select the ProSe Layer-2 ID based on the stored mapping information and transmit the V2X message. The UE receiving the V2X service form the V2X AS providing the V2X service may be a UE belonging to the same PLMN or may be a UE belonging to a different PLMN. The UEs belonging to different PLMNs may receive the V2X service from the same V2X service provider, i.e., the same V2X AS. At this time, to enable communication between the UEs belonging to the different PLMNs, it is required to be aware of the ProSe Layer-2 ID information used in each PLMN mapped with the V2X service ID.

Figure 8A:
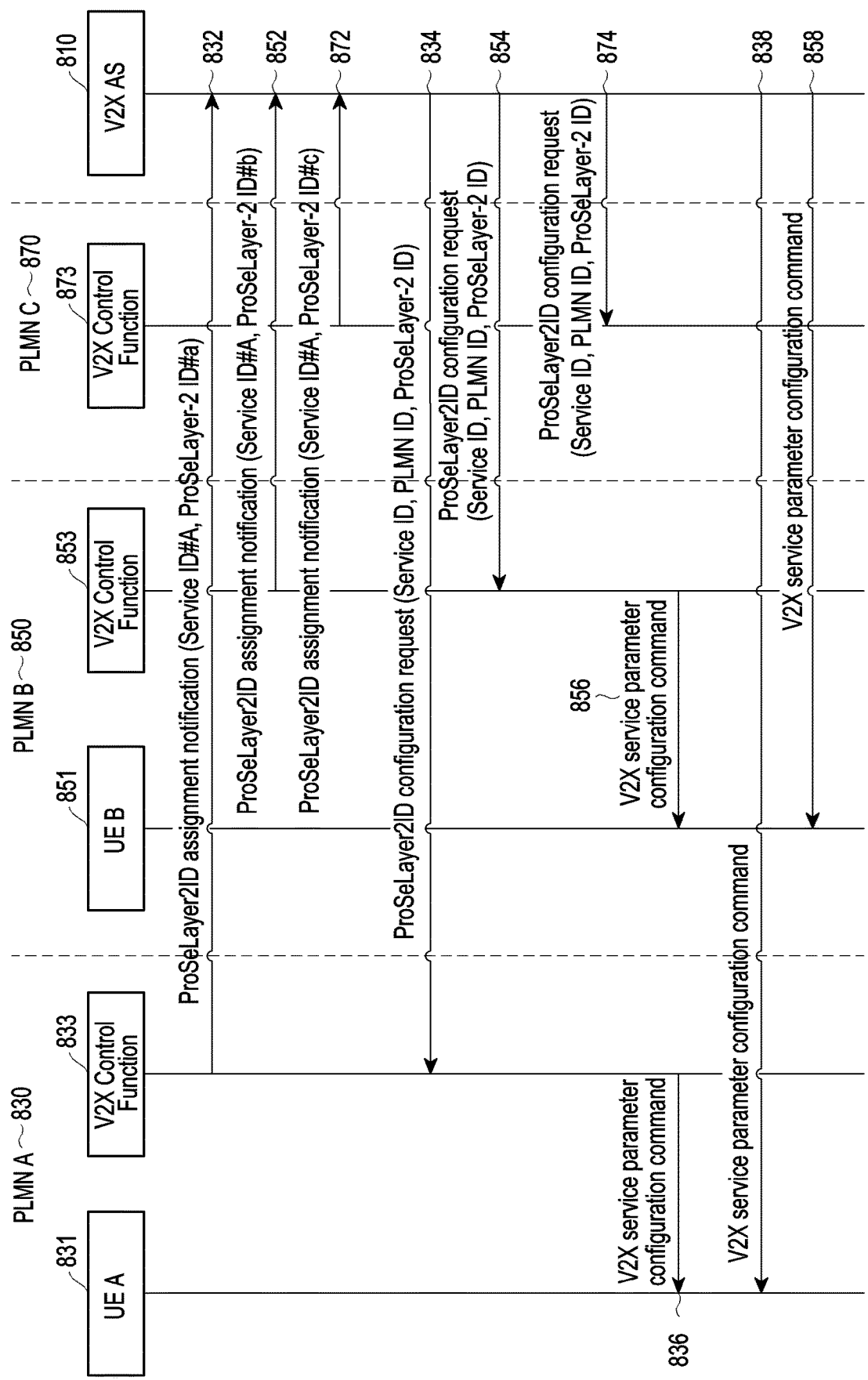
FIG. 8A is a view illustrating a method for configuring a different ProSe Layer-2 ID for each PLMN, according to an embodiment of the disclosure.

FIG. 8A is a view illustrating a method for configuring a different ProSe Layer-2 ID for each PLMN, according to an embodiment of the disclosure.

Referring to FIG. 8A, a V2X AS 810 may enter into a service level agreement with three PLMNs, e.g., PLMN A 830, PLMN B 850, and PLMN C 870 and provide the V2X service to the UEs 831 and 851 belonging to each of the three PLMNs 830, 850, and 870.

A service enrollment procedure between the V2X AS 810 and the UE 831, 851, or 871 may be independently performed. The V2X service provided from the V2X AS 810 is discerned by the V2X service ID. The V2X control functions 833, 853, and 873 of the PLMNs 830, 850, and 870 may allocate the ProSe Layer-2 ID, which is the link layer ID for using the V2X service provided from the V2X AS 810 and notify the V2X AS 810 of the same via a ProSe Layer-2 ID allocation notification message (832, 852, and 872). The ProSe Layer-2 ID allocation notification message may include the ID of the V2X service provided from the V2X AS 810 and the ProSe Layer-2 ID information allocated by the PLMN 830, 850, or 870, mapped thereto.

The V2X control functions 833, 853, and 873 of the PLMNs 830, 850, and 870 may allocate different ProSe Layer-2 IDs to the same V2X service ID (V2X service ID #A) (ProSe Layer-2 ID #a to PLMN A 833, ProSe Layer-2 ID #b to PLMN B 853, and ProSe Layer-2 ID #c to PLMN C 873). The V2X AS 810 receiving the ProSe Layer-2 ID allocation notification message may store the ProSe Layer-2 ID allocated by the PLMN 830, 850, or 870 for each V2X service ID, as shown in Table 1 below.

TABLE 1

| V2X service ID | PLMN ID | ProSe Layer-2 ID |
| --- | --- | --- |
| Service ID#a | PLMN A | ProSe Layer-2 ID#a |
|  | PLMN B | ProSe Layer-2 ID#b |
|  | PLMN C | ProSe Layer-2 ID#c |
| Service ID#b | PLMN A | ProSe Layer-2 ID#d |
|  | PLMN B | ProSe Layer-2 ID#e |

The V2X AS 810 may provide the ProSe Layer-2 ID information, which is allocated by each PLMN 830, 850, or 870 for each V2X service ID, to the V2X control function 833, 853, or 873 of each PLMN 830, 850, or 870 providing the V2X service (834, 854, and 874). It may be assumed that PLMN A 830 and PLMN B 850 provide two V2X services, i.e., V2X service ID #a and V2X service ID #b, which are provided by the V2X AS 810. At this time, the messages 834 and 854 transmitted from the V2X AS 810 to the V2X control function 833 of PLMN A 830 and the V2X control function 853 of PLMN B 850 may include all of the information set forth in the table above. Or, the message sent to the V2X control function 833 of PLMN A 830 may include only the ProSe Layer-2 IDs of the other PLMNs, i.e., PLMN B 850 and PLMN C 870, than the ProSe Layer-2 ID of PLMN A. Similarly, the message sent to the V2X control function 853 of PLMN B 850 may include only the ProSe Layer-2 IDs of the other PLMNs, i.e., PLMN A 830 and PLMN C 870, than the ProSe Layer-2 ID of PLMN B 850. It may also be assumed that PLMN C 870 provides one V2X service, i.e., V2X service ID #a, which is provided by the V2X AS 810. At this time, the message 874 transmitted form the V2X AS to the V2X control function 873 of PLMN C 870 may include only information related to V2X service ID #a.

The V2X control functions 833, 853, and 873 receiving the messages 834, 854, and 874 may store the information included in the messages. The V2X control functions 833, 853, and 873 may provide V2X service parameter configuration information to the UEs 831 and 851 which have enrolled in the V2X service (836 and 856). The messages 836 and 856 may include the service ID corresponding to the V2X service the UE has enrolled in and the ProSe Layer-2 ID information allocated by each PLMN mapped to the service ID. Under the assumption that UE A 831 enrolled in PLMN A 830 has enrolled in V2X service ID #a and V2X service ID #b, the message 836 sent from the V2X control function 833 of PLMN A 830 to UE A 831 may include all of the information set forth in the above table. Or, the V2X AS 810 receiving the messages 832, 852, and 872 from the V2X control functions 833, 853, and 873 of the PLMNs 830, 850, and 870 may directly provide the information set forth in the above table to UE A 831 and UE B 851 (838 and 858).

According to an embodiment of the disclosure, the messages 832, 852, and 872 may include frequency information used in the PLMNs 830, 850, and 870 to provide the V2X service. The V2X AS 810 receiving the messages 832, 852, and 872 may include frequency information used by each PLMN 830, 850, and 870 along with the ProSe Layer-2 ID used by each PLMN 830, 850, and 870 for each V2X service. The messages 834, 854, and 876 may include the frequency information and the ProSe Layer-2 ID used by each PLMN 830, 850, and 870 for each V2X service. The messages 836, 838, 856, and 858 may include the service IDs the UEs 831 and 851 have enrolled in and frequency information and the ProSe Layer-2 ID used by each PLMN 830, 850, and 870 mapped thereto.

According to an embodiment of the disclosure, the UEs 831 and 851 may receive the messages 836, 838, 856, and 858 and may store the IDs of the V2X services available to the UEs 831 and 851 and the per-PLMN ProSe Layer-2 ID mapped to each V2X service. The frequency information used by each PLMN 830, 850, and 870 for each V2X service may be included in the messages 836, 838, 856, and 858 or may be included in the SIB message transmitted to the UE from the AN (base station) to which the UE 831 and 851 is connected.

Figure 8B:
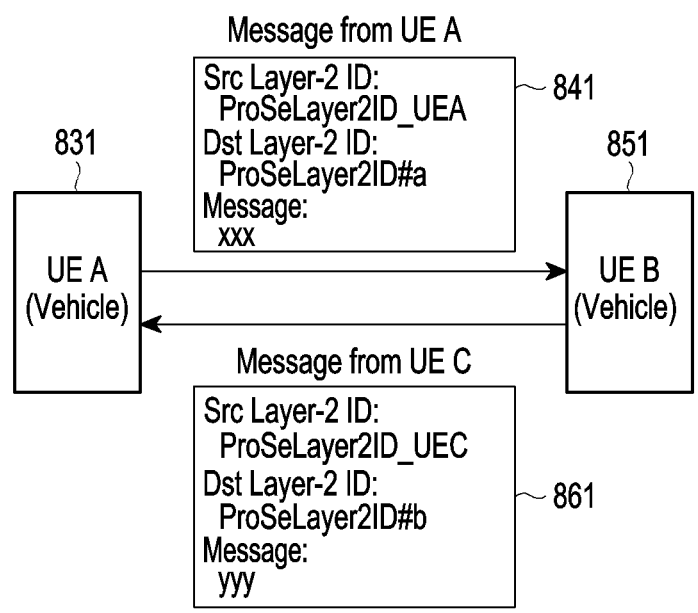
FIG. 8B is a view illustrating a method of communication between UEs enrolled in different PLMNs, according to an embodiment of the disclosure.

FIG. 8B is a view illustrating a method of communication between UEs enrolled in different PLMNs, according to an embodiment of the disclosure.

Referring to FIG. 8B, UE A 831 which is using V2X service ID #a may generate a message of V2X service ID #a and transmit the message 841, in which the Destination Layer-2 ID has been set as the ProSe Layer-2 ID #a mapped with V2X service ID #a, to UE B 851, based on the V2X service parameter information received in 836. UE B 851 receiving the message 841 may identify that the Destination Layer-2 ID is set as ProSe Layer-2 ID #a and may be aware that the ProSe Layer-2 ID is the ProSe Layer-2 ID corresponding to V2X service ID #a, based on the information included in the V2X service parameter received in 856. Accordingly, UE B 851 may process the V2X message 841 received from UE A 831. Similarly, UE A 831 may identify that the Destination Layer-2 ID of the V2X message 861 received from UE B 851 is set as ProSe Layer-2 ID #b and may be aware that the ProSe Layer-2 ID is the ProSe Layer-2 ID corresponding to V2X service ID #a, based on the information included in the V2X service parameter received in 836. Accordingly, UE A 831 may process the V2X message received from UE B 851.

Figure 9:
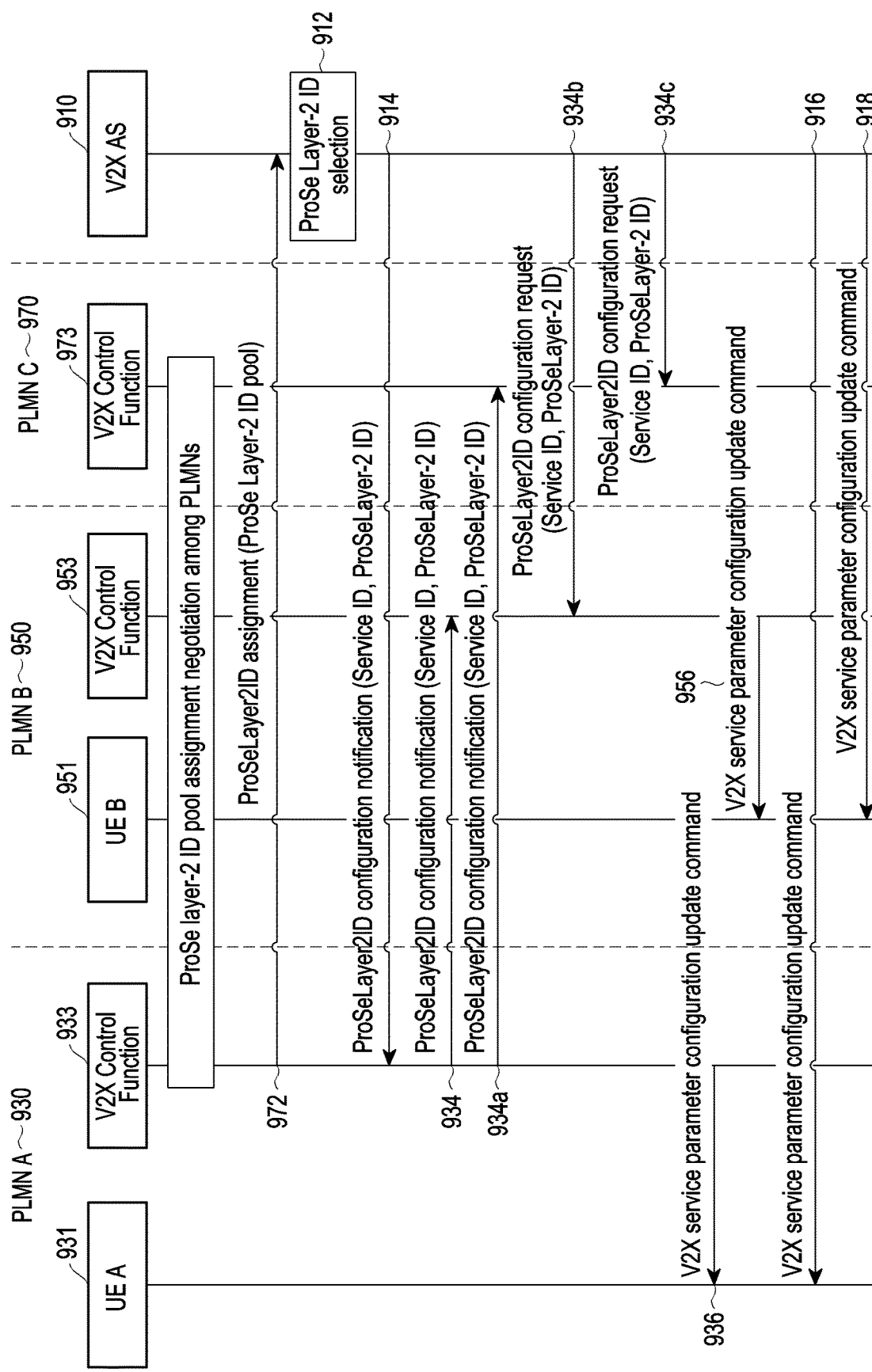
FIG. 9 is a view illustrating a method for selecting a ProSe Layer-2 ID by a V2X AS, according to an embodiment of the disclosure.

FIG. 9 is a view illustrating a method for selecting a ProSe Layer-2 ID by a V2X AS, according to an embodiment of the disclosure.

Referring to FIG. 9, PLMN A 930, PLMN B 950, and PLMN C 970 which provide the V2X service may enter into a service level agreement therebetween and manage a common ProSe Layer-2 ID pool to be used for the V2X service. The ProSe Layer-2 ID pool may be configured as a list of ProSe Layer-2 IDs.

The V2X control function 933 of any PLMN 930 among the plurality of PLMNs may provide the V2X AS 910 with information about the ProSe Layer-2 ID pool jointly managed by the plurality of PLMNs (932). The V2X AS 910 may store and manage the information about the ProSe Layer-2 ID pool and, to provide the V2X service, select one ProSe Layer-2 ID from the ProSe Layer-2 ID pool and generate the mapping information of the selected ProSe Layer-2 ID and the V2X service ID (912). The V2X AS 910 may notify the V2X control function 933 of the mapping information via a notification message (914). The V2X control function 933 receiving the notification message may share the received mapping information with the V2X control functions 953 and 973 of other PLMNs (934 and 934a). Or, the V2X AS 910 may notify the V2X control functions of all the PLMNs using the service of the mapping information (934b and 934c).

The V2X control functions 933, 953, and 973 may display that the ProSe Layer-2 ID being used in the V2X service in the ProSe Layer-2 ID pool. By the above-described procedure, several PLMNs 930, 950, and 970 may configure the same ProSe Layer-2 ID for one service provided by the V2X AS 910.

The mapping information may be transferred to the UEs 931, 951, and 971 via the messages 936, 956, 916, and 918.

Figure 10:
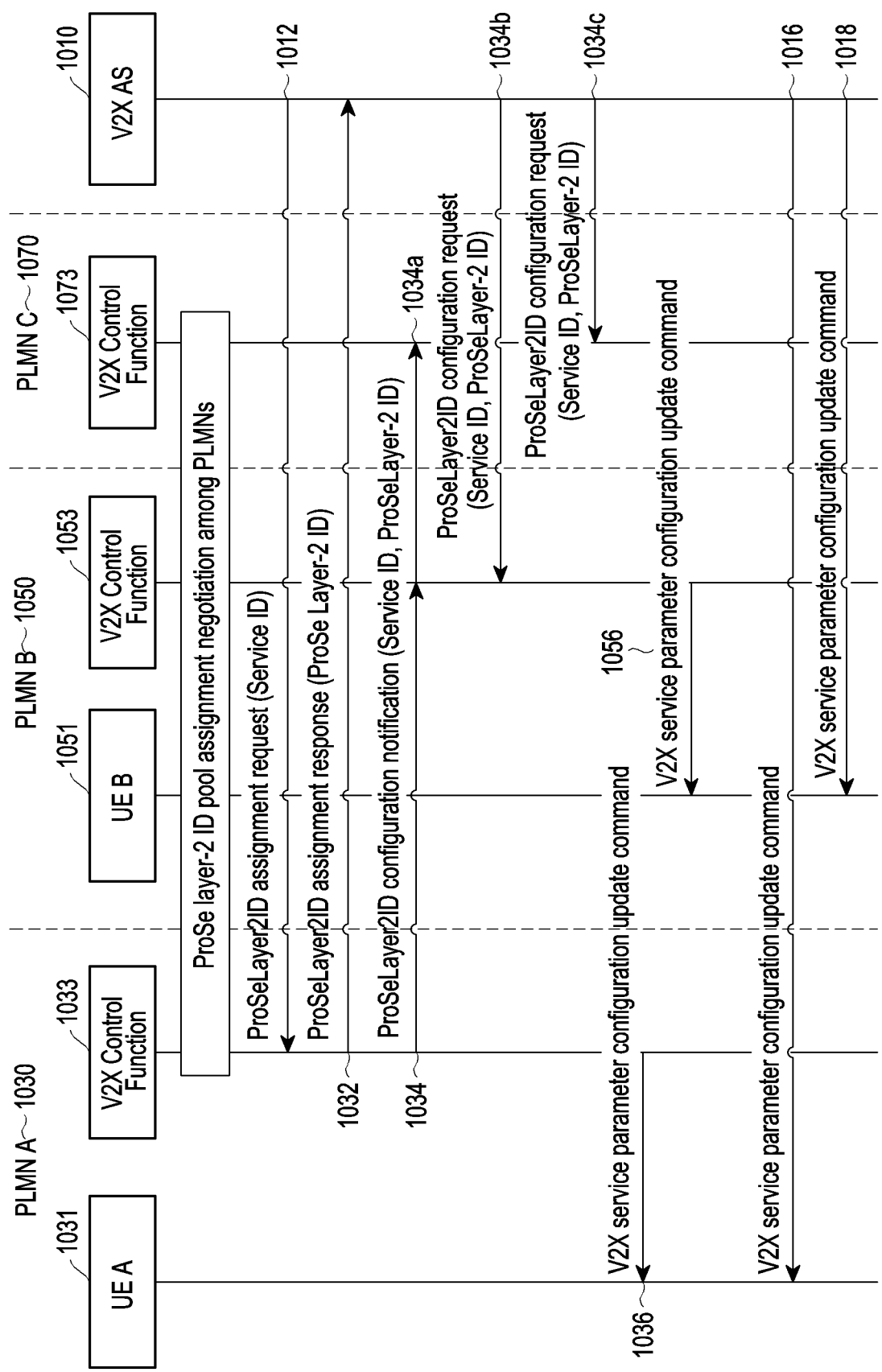
FIG. 10 is a view illustrating a method for selecting a ProSe Layer-2 ID at a request from a V2X AS, according to an embodiment of the disclosure.

FIG. 10 is a view illustrating a method for selecting a ProSe Layer-2 ID at a request from a V2X AS, according to an embodiment of the disclosure.

Referring to FIG. 10, PLMN A 1030, PLMN B 1050, and PLMN C 1070 which provide the V2X service may enter into a service level agreement therebetween and manage a common ProSe Layer-2 ID pool to be used for the V2X service.

The ProSe Layer-2 ID pool may be configured as a list of ProSe Layer-2 IDs. The V2X AS 1010 may send a ProSe Layer-2 ID allocation request message to the V2X control function 1033 of any PLMN of the plurality of PLMNs to provide the V2X service (1012). The V2X control function 1033 receiving the ProSe Layer-2 ID allocation request message may select one ProSe Layer-2 ID managed in the ProSe Layer-2 ID pool and send a response message to the V2X AS 1010 (1032). The response message may include the V2X service ID included in the message 1012 and the ProSe Layer-2 ID information selected by the V2X control function mapped thereto. The V2X AS 1010 receiving the response message may store the mapping information included in the received response message 1032. The V2X control function 1033 may share the mapping information with the V2X control functions 1053 and 1073 of other PLMNs (1034 and 1034a). Or, the V2X AS 1010 may notify the V2X control functions of all the PLMNs using the service of the mapping information (1034b and 1034c).

The V2X control functions 1033, 1053, and 1073 may display that the ProSe Layer-2 ID being used in the V2X service in the ProSe Layer-2 ID pool.

By the above-described procedure, several PLMNs 1033, 1053, and 1073 may configure the same ProSe Layer-2 ID for one service provided by the V2X AS 1010.

The mapping information may be transferred to the UEs via the messages 1036, 1056, 1016, and 1018d.

According to an embodiment of the disclosure, the UEs may receive the messages 1036, 1056, 1016, and 1018d and may store the IDs of the V2X services available to the UEs 1031, 1051, and 1071 and the ProSe Layer-ID mapped to each V2X service. The frequency information used by each PLMN for each V2X service may be included in the messages 1036, 1056, 1016, and 1018d or may be included in the SIB message transmitted to the UE 1031, 1051, and 1071 from the AN (base station) to which the UE 1031, 1051, and 1071 is connected.

Figure 11:
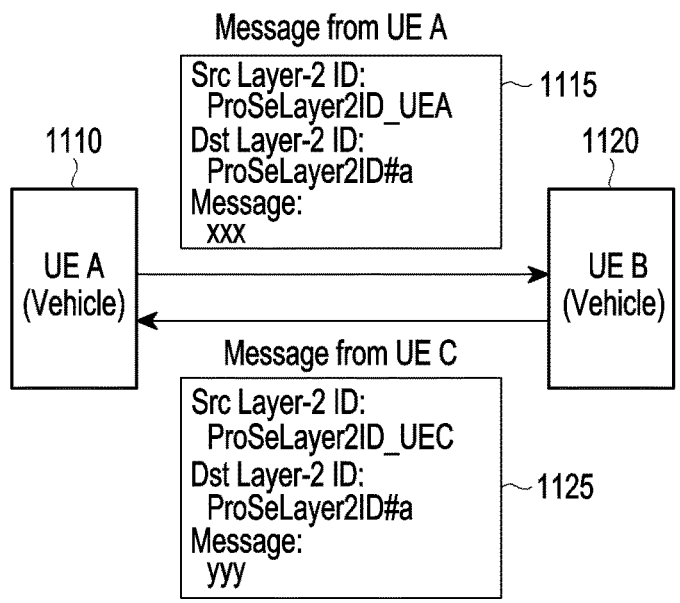
FIG. 11 is a view illustrating a method of communication between UEs enrolled in different PLMNs, according to an embodiment of the disclosure.

FIG. 11 is a view illustrating a method of communication between UEs enrolled in different PLMNs, according to an embodiment of the disclosure.

A difference from FIG. 8B is that although UE A 1110 and UE B 1120 are UEs enrolled in different PLMNs, they may use the same Destination ProSe Layer-2 ID for the same V2X service.

According to an embodiment of the disclosure, the V2X AS (not shown) may determine the ProSe Layer-2 ID by applying a predetermined rule without ProSe Layer-2 ID pool information. The rule may include information included in the ProSe Layer-2 ID and the number of bits that may indicate the information. For example, in the case where the ProSe Layer-2 ID is configured of 24 bits, the first four bits may be set as a value indicating the V2X service provider, and the last 20 bits as a value indicating the V2X service. The number of the bits may be an arbitrary value for the purpose of describing the instant example, and its range may be varied.

Figure 12:
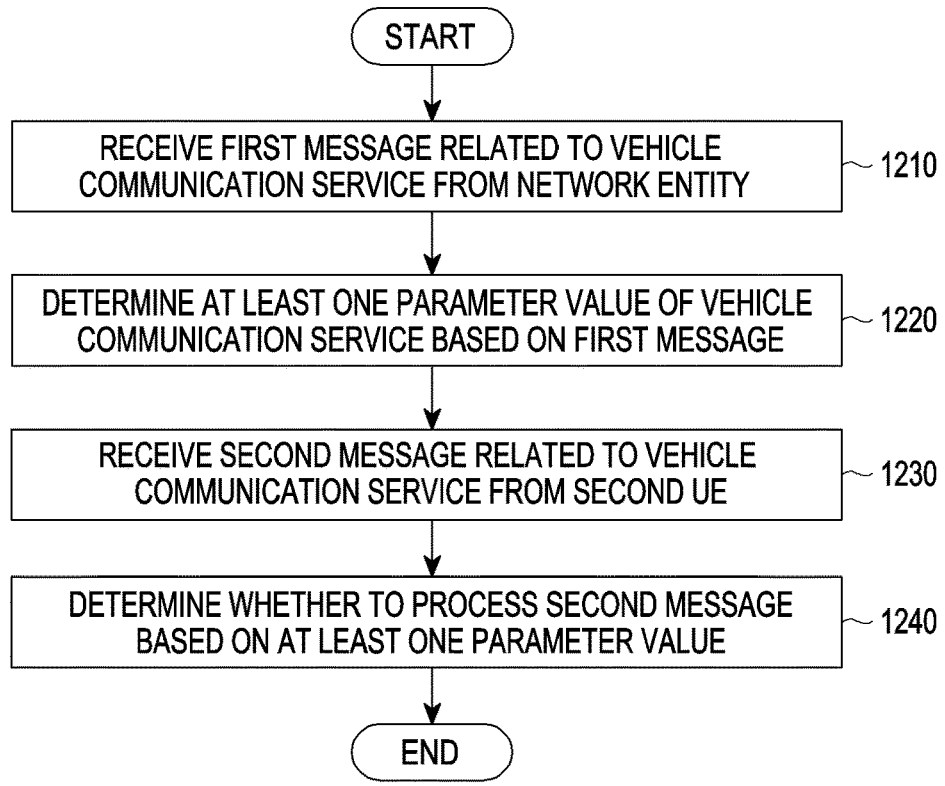
FIG. 12 is a view illustrating a method for performing a vehicle communication service by a first UE, according to an embodiment of the disclosure.

FIG. 12 is a view illustrating a method for performing a vehicle communication service by a first UE, according to an embodiment of the disclosure.

Referring to FIG. 12, a first UE included in a wireless communication system may receive a first message related to a vehicle communication service from a network entity (1210).

The vehicle communication service may include a vehicle platooning service. The first message may include information related to at least one parameter for performing the vehicle platooning service. Information related to at least one parameter for performing the vehicle platooning service may include a rule for determining at least one parameter value.

For example, the vehicle communication service may include a driving route providing service. The first UE may determine information related to a driving route based on at least one parameter value.

The first UE may determine at least one parameter value of the vehicle communication service based on the first message (1220).

The first UE may select at least one vehicle platooning group based on the information related to the at least one parameter for performing the vehicle platooning service.

The first UE may receive a second message related to the vehicle communication service from a second UE (1230).

The first UE may determine whether to process the second message based on at least one parameter value (1240).

If at least one second parameter value included in the second message is identical to at least one parameter value, the first UE may transmit a response message responsive to the second message to the second UE.

In the case where the vehicle communication service is enrolled in a first public land mobile network (PLMN) where the first UE has enrolled, and the second UE enrolls in the vehicle communication service in the second PLMN, the first PLMN and the second PLMN may share information related to at least one parameter for performing the vehicle communication service.

Figure 13:
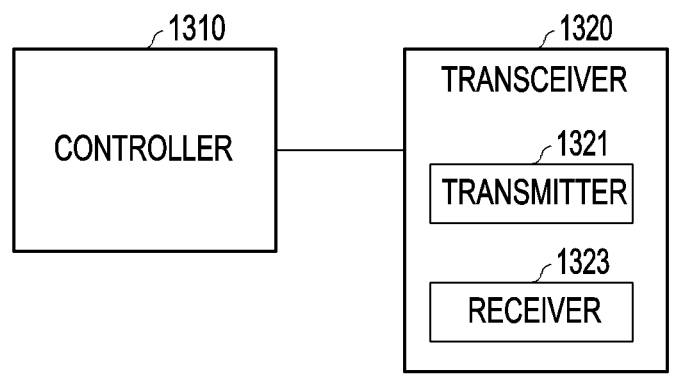
FIG. 13 is a view illustrating a configuration of a UE according to an embodiment of the disclosure.

FIG. 13 is a view illustrating a configuration of a UE according to the disclosure.

Referring to FIG. 13, according to an embodiment of the disclosure, a UE may include a transceiver 1320 and a controller 1310 for controlling the overall operation of the UE. The transceiver 1320 may include a transmitter 1321 and a receiver 1323. The controller 1310 and the transceiver 1320 may be configured to perform at least one of the methods described above in connection with FIGS. 1 to 9.

The transceiver 1320 may transmit and receive signals to/from other network entities.

The controller 1310 may control the UE to perform any one operation of the above-described embodiments. Meanwhile, the controller 1310 and the transceiver 1320 are not necessarily implemented in separate modules but rather as a single component, e.g., a single chip. The controller 1310 and the transceiver 1320 may be electrically connected with each other. For example, the controller 1310 may be a circuit, an application-specific circuit, or at least one processor. The operations of the UE may be implemented by providing a memory device storing a corresponding program code in any component of the UE.

Figure 14:
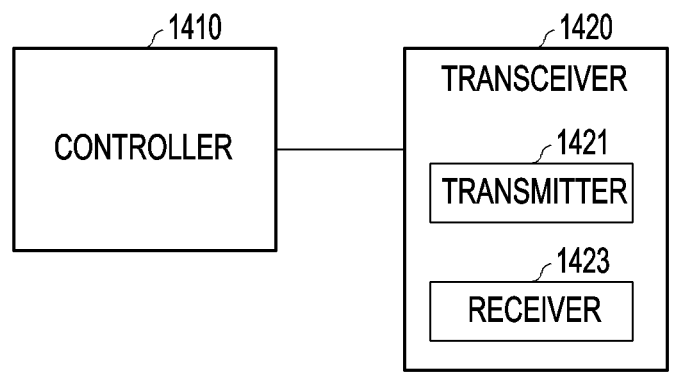
FIG. 14 is a view illustrating a configuration of a network entity according to an embodiment of the disclosure.

FIG. 14 is a view illustrating a configuration of a network entity according to an embodiment of the disclosure.

According to an embodiment of the disclosure, a network entity may include a transceiver 1420 and a controller 1410 for controlling the overall operation of the network entity. The transceiver 1420 may include a transmitter 1421 and a receiver 1423. The controller 1410 and the transceiver 1420 may be configured to perform at least one of the methods described above in connection with FIGS. 1 to 9.

The transceiver 1420 may transmit and receive signals to/from other network entities.

The controller 1410 may control the network entity to perform any one operation of the above-described embodiments. Meanwhile, the controller 1410 and the transceiver 1420 are not necessarily implemented in separate modules but rather as a single component, e.g., a single chip. The controller 1410 and the transceiver 1420 may be electrically connected with each other. For example, the controller 1410 may be a circuit, an application-specific circuit, or at least one processor. The operations of the network entity may be implemented by providing a memory device storing a corresponding program code in any component of the network entity.

It should be noted that the configuration views, example views of control/data signal transmission methods, example views of operational procedures, and configuration views of FIGS. 1 to 14 are not intended as limiting the scope of the disclosure. In other words, all the components, entities, or operational steps illustrated in FIGS. 1 to 14 should not be construed as essential components to practice the present invention, and the present invention may be rather implemented with only some of the components without departing from the gist of the present invention.

The above-described operations of the base station or UE may be realized by equipping a memory device retaining their corresponding codes in the base station device or any component of the UE device. That is, the controller in the eNB or UE may execute the above-described operations by reading and executing the program codes stored in the memory device by a processor or central processing unit (CPU).

As described herein, various components or modules in the entity, base station or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method of performing a group-based vehicle communication by a first user equipment (UE) in a wireless communication system, comprising:
   identifying a request for a V2X application enabler (VAE) in the first UE to configure a dynamic group for the group-based vehicle communication;
   generating, by the VAE, a ProSe Layer-2 group ID related to the dynamic group for the group-based vehicle communication based on ProSe Layer-2 group ID generation rules; and
   transmitting, to a second UE, a first message including the ProSe Layer-2 group ID,
   wherein the ProSe Layer-2 group ID corresponds to a V2X group for the group-based vehicle communication.

2. The method of claim 1, further comprising:
   receiving, from the second UE, a second message including the ProSe Layer-2 group ID; and
   storing communication parameters.

3. The method of claim 2, wherein the ProSe Layer-2 group ID corresponds to location information, and wherein if the second UE is scheduled to visit a location related to the location information, the second UE transmits the second message.

4. The method of claim 3, wherein the location information includes at least one of a destination of the first UE or an intermediate point related to the destination of the first UE.

5. The method of claim 1, further comprising:
   performing the group-based vehicle communication with the second UE using the ProSe Layer-2 group ID.

6. The method of claim 5, wherein the group-based vehicle communication is performed by a group of UEs subscribing to a vehicle platooning service.

7. The method of claim 1, further comprising:
   receiving, from a network entity, a third message including the ProSe Layer-2 group ID when the first UE is connected to the network entity.

8. The method of claim 7, wherein the network entity includes V2X application server.

9. The method of claim 8, further comprising receiving information including the ProSe Layer-2 group ID generation rules broadcast from the V2X application server.

10. The method of claim 7, wherein the network entity includes a road side unit (RSU).

11. The method of claim 10, further comprising receiving information including the ProSe Layer-2 group ID generation rules broadcast from the RSU.

12. The method of claim 1, wherein the first message is transmitted on a PC5 channel.

13. A first user equipment (UE) configured to perform group-based vehicle communication in a wireless communication system, the first UE comprising:
- a transceiver; and
- a controller coupled with the transceiver and configured to control to:
  - identify a request for a V2X application enabler (VAE) in the first UE to configure a dynamic group for the group-based vehicle communication,
  - generate, by the VAE, a ProSe Layer-2 group ID related to the dynamic group for the group-based vehicle communication based on ProSe Layer-2 group ID generation rules, and
  - transmit, to a second UE, a first message including the ProSe Layer-2 group ID,
- wherein the ProSe Layer-2 group ID corresponds to a V2X group for the group-based vehicle communication.

14. The first UE of claim 13, wherein the controller is configured to:
- receive, from the second UE, a second message including the ProSe Layer-2 group ID, and
- store communication parameters.

15. The first UE of claim 13, wherein the controller is configured to: perform the group-based vehicle communication with the second UE using the ProSe Layer-2 group ID, and
- wherein the group-based vehicle communication is performed by a group of UEs subscribing to a vehicle platooning service.

16. The first UE of claim 13,
- wherein the controller is configured to receive, from a network entity, a third message including the ProSe Layer-2 group ID when the first UE is connected to the network entity, and
- wherein the network entity includes V2X application server.

17. The first UE of claim 13,
- wherein the first message is transmitted on a PC5 channel.

* * * * *